United States Patent [19]

Kato

[11] E Patent Number: Re. 33,466

[45] Reissued Date of Patent: Dec. 4, 1990

[54] INDUSTRIAL ROBOT WITH AUTOMATIC CENTERING

[75] Inventor: Hisao Kato, Aichi, Japan

[73] Assignee: Mitsubishi Denki Kabushiki Kaisha, Tokyo, Japan

[21] Appl. No.: 509,939

[22] Filed: Apr. 16, 1990

Related U.S. Patent Documents

Reissue of:

[64] Patent No.: 4,738,015
Issued: Apr. 19, 1988
Appl. No.: 8,245
Filed: Jan. 29, 1987

[30] Foreign Application Priority Data

Feb. 7, 1986 [JP] Japan ..... 61-24206

[51] Int. Cl.[5] ..... H05K 3/30

[52] U.S. Cl. ..... 29/708; 29/407; 29/709; 901/15

[58] Field of Search ..... 29/407, 701, 703, 708, 29/709; 901/9, 15, 16

[56] References Cited

U.S. PATENT DOCUMENTS 4,528,747 7/1985 Hoffman et al. ..... 29/741 X
4,557,044 12/1985 Crowman et al. ..... 29/741
4,630,344 12/1986 Boyle ..... 29/525 X

*Primary Examiner*—Timothy V. Eley
*Attorney, Agent, or Firm*—Sughrue, Mion, Zinn, Macpeak & Seas

[57] ABSTRACT

The horizontal movement actuators 3 of an industrial robot arm 2 are deenergized after an initial engagement between a workpiece 8 grasped by a robot hand and a base member 10 disposed on a support table 12 so that any axial misalignment between the workpiece and a hole 11 in the base member is automatically corrected with the guidance of a chamfer 8*a*, 10*b* provided on the workpiece and/or the hole.

9 Claims, 4 Drawing Sheets

INDUSTRIAL ROBOT WITH AUTOMATIC CENTERING

Matter enclosed in heavy brackets [ ] appears in the original patent but forms no part of this reissue specification; matter printed in italics indicates the additions made by reissue.

BACKGROUND OF THE INVENTION

The present invention relates to an industrial robot and, particularly, to such a robot which is capable of accurately fitting an assembling member into a corresponding hole formed in an assembling base fixedly secured to a support structure to implement an assembly operation.

FIG. 1 is a front view of a hand of a conventional industrial robot for fitting a part to a base, in which an automatic alignment device 6 is composed of a upper plate 6a fixedly secured to a rotary shaft 5 extending vertically from a free end of a robot arm 4, a core member 6b extending vertically from the upper plate 6a, a lower plate 6c arranged in parallel to the upper plate 6a, and a link mechanism for movably supporting the lower plate 6c in parallel to the upper plate 6a. The link mechanism is composed of three parallel links each having, at opposite ends thereof, spheres which are received in spherical bearings 6d' and 6d''' provided correspondingly on a lower surface of the upper plate 6a and an upper surface of the lower plate 6c.

A cylinder member 6e is fixed to the lower plate 6c. Its length is sufficient to extend over a lower portion of the core member 6b.

Such lower portion of the core member 6b is supported by an elastic member 6f within the cylinder member 6e to allow a relative movement therebetween. A gripper 7 is mounted on the lower plate 6c and has gripping nails 7a actuated by an air or oil pressure motor to grip a workpiece 8 in the form of a rod member having a chamfered end 8a which is to be inserted into a blind hole 10a formed in a workpiece 10 disposed fixedly on a table 9. The hole has a chamfered opening 10b.

When an elevation shaft of the robot is lowered to fit the rod member 8 into the hole 10a with a center axis of the rod member 8 deviating slightly from a center axis of the hole 10a, the fitting can be achieved as long as the mount of deviation is within the range of the chamfer 8a of the rod member 8, due to the deformation of the elastic member 6f as shown in FIG. 2. Therefore, under these conditions, by lowering the elevation shaft, the rod member 8 can be inserted automatically into the hole 10a and the desired assembling operation is achieved.

In the conventional hand device mentioned above, the manufacturing cost is high due to such complicated mechanical structure, and the size of the hand cannot be reduced, resulting in a lowered space efficiency.

SUMMARY OF THE INVENTION

An object of the present invention is to provide an industrial robot having a compact hand while having an automatic alignment function implemented by deenergizing horizontal movement actuators of the gripper or hand when the workpiece reaches a predetermined position in relation to the hole.

With such features, the space efficiency is improved and a highly accuate fitting operation can be realized.

DETAILED DESCRIPTION OF THE PREFERRED EMBODIMENTS

In an industrial robot according to the present invention, either an end portion of an assembly part grasped by a gripper of the robot or an edge of a hole formed in an assembly base fixed on a support structure into which the part is to be inserted is chamfered, and the operation of an actuator for driving a robot arm holding the part is stopped to allow a relative horizontal movement between the part and the hole in which the part is to be fitted when an initial engagement is established therebetween by lowering the robot arm. The robot arm is then lowered further to complete the fitting operation.

In the present invention, since at least one of the pieces to be fitted together has a chamfered portion, a movable one of the pieces is allowed to freely move relative to the other fixed piece in a horizontal plane after the initial engagement thereof is established, resulting in a highly accurate fitting operation.

Figure 1:
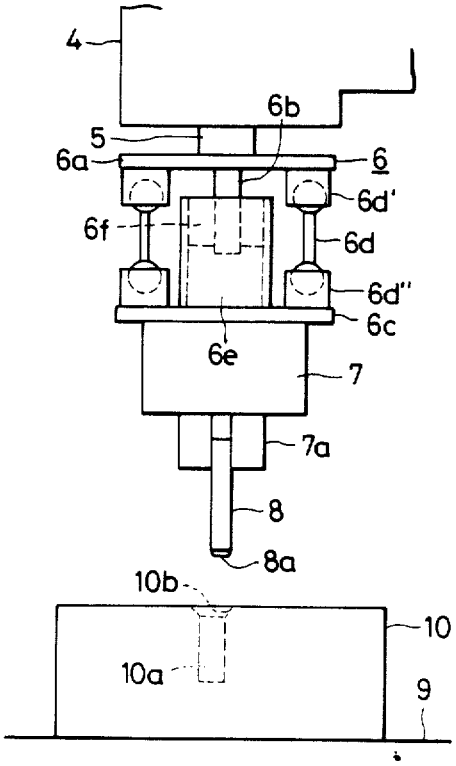
FIG. 1 PRIOR ART
FIGS. 1 and 2 are front views of a conventional industrial robot, respectively.
Figure 2:
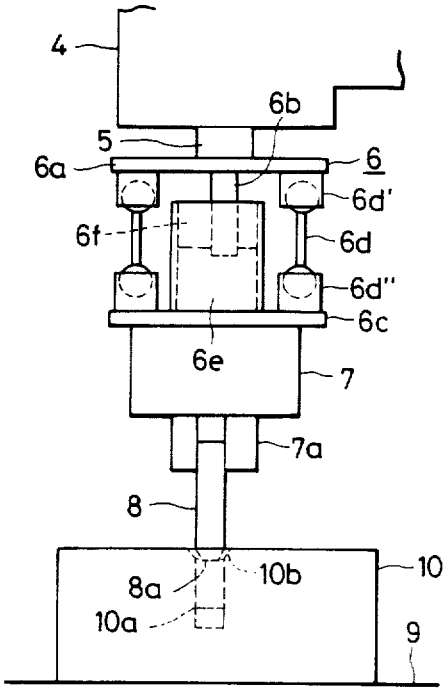
FIG. 2 PRIOR ART
Figure 3:
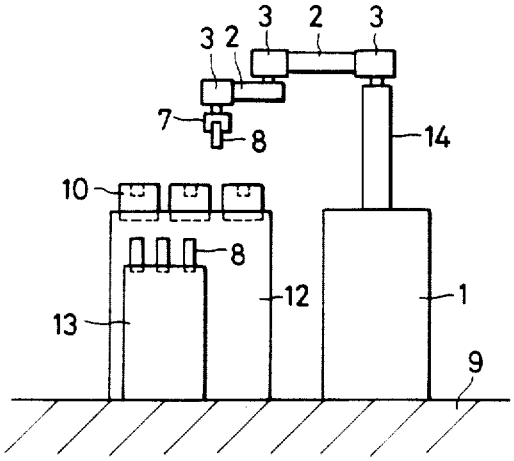
FIG. 3 illustrates a general arrangement of an embodiment of the present inventions.
Figure 4:
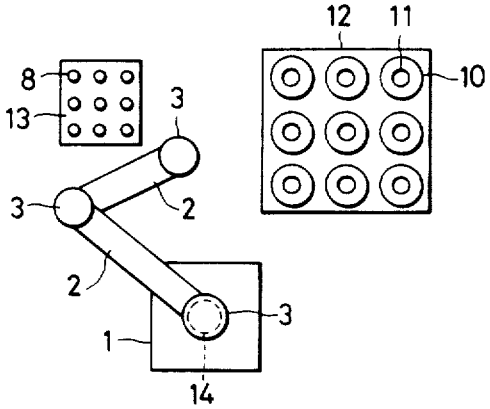
FIG. 4 is a top view of the arrangement in FIG. 3.

In FIGS. 3 and 4 which show a general arrangement of an embodiment of an industrial robot according to the present invention in fornt and plan views, respectively, a main body 1 of a "pick and place" robot supports a vertically movable elevation shaft 14 having an upper end supporting a first actuator 3 operatively connected to one end of a first robot arm 2 to swing it in a horizontal plane. A second actuator 3 is provided on the other end of the first robot arm 2, and supports an end of a second robot arm 2 to swing it in a horizontal plane.

A third actuator 3 is provided on the other end of the second robot arm 2, and drives a hand drive 7. The hand device 7 supports a workpiece 8 which is, in this embodiment, to be fitted into a hole 11 formed in an assembly base 10 disposed on a base 12. Spare workpieces 8 are disposed on a parts table 13 arranged in the vicinity of the base 12.

Figure 6:
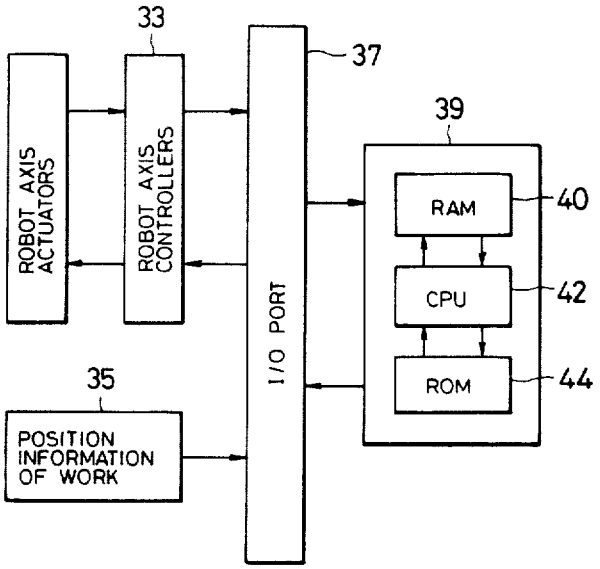
FIG. 6 is a block diagram showing the construction of a controller section of the present invention.

The operation of the robot shown in FIG. 4 is controlled by a controller C which is constructed as shown in the block diagram of FIG. 6. The controller C is composed of a shaft control section 33, and I/O port 37, an information processing device 39 and a work position detector 35 for supplying work position information through the I/O port to the processing device 39. The shaft control section 33 is operatively connected to the respective actuators 3 through the I/O port 37. The processing device 39 includes a central processing unit 42, a read only memory 44 for storing a program, and a random access memory 40 for storing various temporary data.

Figure 5:
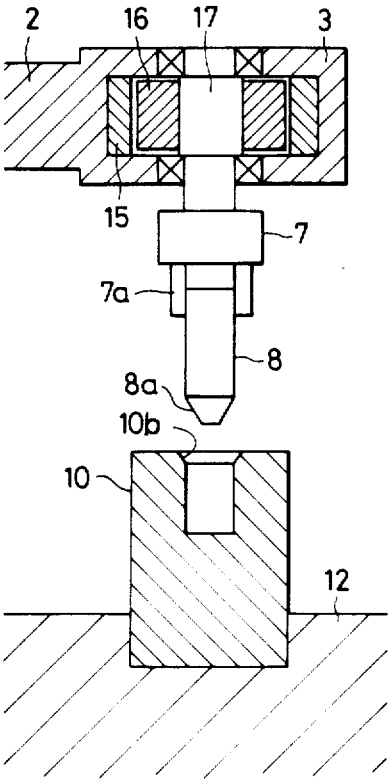
FIG. 5 is a cross-section of a portion of the embodiment in FIG. 3, showing an actuator and a hand thereof in detail.

The operation of the robot is controlled according to the program stored in the ROM 44. Firstly, the elevation shaft 14 and then the actuators 3 are actuated so that the hand 7 is positioned above one of the workpieces 8 on the table 13. Then, the shaft 14 is lowered to allow the hand 7 to grasp the workpiece. Then, the shaft 14 and the actuators 3 are drives so that the hand becomes positioned above a hole of the base 10 as shown in FIG. 5, whereafter the shaft 14 is lowered until the chamfered ends 8a of the workpiece 8 enters into the chamfered edge 10b of the base 10 to a predetermined extent. When the chamfered end 8a reaches the predetermined depth from the chamfered edge 10b of the hole, positioned information corresponding thereto is inputted by the work positions information section 35 to the I/O port 37 as shown in FIG. 6. This information is processed together with information from the RAM 33 and the ROM 44 by the CPU 42, and an instruction is supplied from the I/O port 37 to the control device 33 to deenergize all of the actuators 3 so that the drive shaft 17 of the actuators become free from any influence by the stators 15. All of the joints of the robot are thus permitted to move freely with respect to their adjacent arms. Therefore, the hand 7 is put in a state where it can be moved by an external driving force.

Then, when the shaft 14 is further lowered, the chamfered end 8a of the workpiece 8 is inserted into the hole of the base 10 with the guidance of the chamfered edge 10b thereof. After the workpiece 8 is inserted into the hole to a predetermined depth with centers thereof being aligned, a programmed operation is performed.

Figure 7:
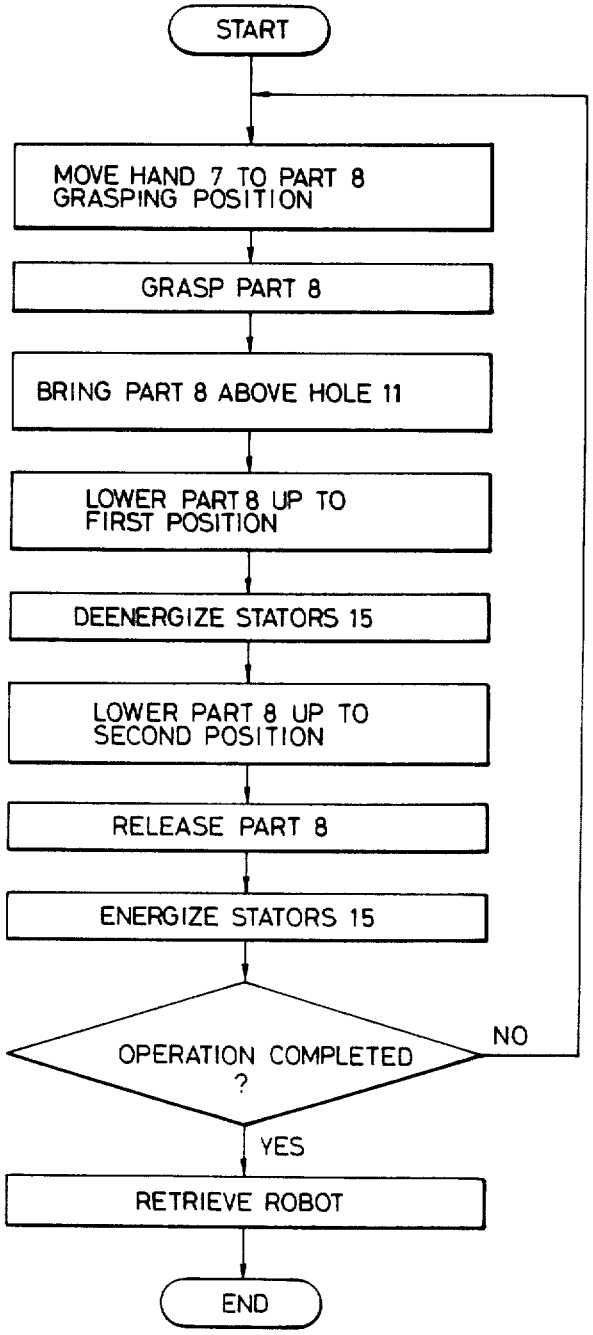
FIG. 7 is a flow-chart showing a control operation of the robot according to the present invention.

FIG. 7 is a flow-chart showing the control operation of the robot mentioned above. As shown in FIG. 7, the hand 7 is firstly moved to a position above the parts table 13 corresponding to the part 8. Then, the part 8 is grasped by the grasping nails 7a of the hand. Thereafter, the hand 7 is moved just above the hole 11 of the base 10 by swinging the robot arms 2. Then, the part 8 is lowered by retracting the elevation shaft 14 to a first predetermined position, which is sensed by detecting the amount of vertical movement of the shaft 14 or by detecting contact between the part 8 and the base 10. When it is sensed that the part 8 reaches the first position, the stators 15 of the actuators 3 are deenergized to render the hand 7 free of control. Under these conditions, the elevation shaft 14 is lowered to further lower the part 8 to a second predetermined position.

Then, the part 8 is separated from the hand and the stators 15 of the actuators 3 are energized to retrieve the robot arms. Thus, fitting of the part to the base is completed.

Figure 8:
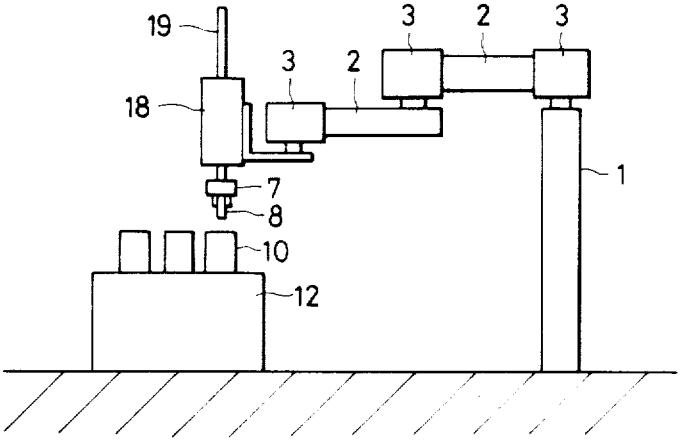
FIG. 8 is a front view of another embodiment of the present invention.

Although, in the mentioned embodiment, the vertical movement of the hand 7 is controlled by the vertical movement of the elevation shaft 14, it is possible to fixedly provide an elevating device 18 having a shaft 19 on a drive shaft of the third actuator 3 at the outer end of the second arm 2 and to control the device 18 in the same way, as shown in FIG. 8.

As mentioned hereinbefore, according to the present invention, the actuators provide at various joints of the robot are deenergized to render the hand free from any restrictions due to the active actuators and to allow it to freely move in a horizontal plane when the initial positioning of the hand is completed. The hand can be further moved horizontally under the guidance of a chamfer formed in the workpiece held by the hand and/or the hole of the base so that the complete engagement thereof is achieved. Therefore, there is no need of a complicated automatic position regulator.

What is claimed is:

1. An industrial robot for fitting in assembly part (8) held by a holding means (7) into a hole (11) of a base member (10) fixedly mounted on a support structure (12), comprising:

(a) a robot arm (2) fixedly mounting said holding means on an end thereof, (b) elevation means including a vertical shaft (14;19) for vertically moving said holding means, (c) a plurality of actuators (3) for swinging said robot arm horizontally, and (d) control means for controlling operations of said elevation means and said actuators, (e) at least one base and an insertion end of said assembly part being chamfered (8a, 10b), said control means being responsive to a detection of said assembly part being lowered by said elevation means to a position near said hole of said base or to a position at which said part is inserted slightly into said hole to deenergize said actuators, and to cause said elevation means to further lower said part to thereby fit said part in said hole, the deenergization of the actuators rendering the holding means freely movable in a horizontal plane such that any axial misalignment between the assembly part and the hole is automatically corrected by a centering effect of the chamfer during the further lowering of the elevation means.

2. The industrial robot as claimed in claim 1, wherein both said hole and said insertion end of said part are chambered.

3. The industrial robot as claimed in claim 1, wherein said robot arm comprises a plurality of linked arms.

4. The industrial robot as claimed in claim 3, wherein said actuators are individually disposed at linking portions of said arms.

5. The industrial robot as claimed in claim 4, wherein said elevation means drives said holding means vertically via a coupling between said vertical shaft (14) and a rear end of said robot arm.

6. The industrial robot as claimed in claim 4, wherein said elevation means comprises a cylinder (18) mounted on an outer end of said robot arm for vertically driving said shaft (14), said holding means being mounted on said shaft.

7. The industrial robot as claimed in claim 1, wherein an actuator is provided in an outer end of said robot arm and said holding means is mounted on a drive shaft (17) of said actuator.

8. The industrial robot as claimed in claim 1, wherein said control means detects an approach of said part to said base by monitoring the vertical movement of said elevation means.

9. The industrial robot as claimed in claim 1, wherein said control means detects an initial insertion of said part into said hole by sensing contact between said part an said base.

* * * * *